(12) United States Patent
Kubo et al.

(10) Patent No.: US 12,113,701 B2
(45) Date of Patent: Oct. 8, 2024

(54) COMMUNICATION APPARATUS AND COMMUNICATION METHOD

(71) Applicant: NIPPON TELEGRAPH AND TELEPHONE CORPORATION, Tokyo (JP)

(72) Inventors: Takahiro Kubo, Musashino (JP); Ayako Iwaki, Musashino (JP); Yutaka Watanabe, Musashino (JP); Kazuhisa Furusawa, Musashino (JP); Shinichi Yoshihara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 373 days.

(21) Appl. No.: 17/622,074

(22) PCT Filed: Jun. 25, 2019

(86) PCT No.: PCT/JP2019/025193
§ 371 (c)(1),
(2) Date: Dec. 22, 2021

(87) PCT Pub. No.: WO2020/261393
PCT Pub. Date: Dec. 30, 2020

(65) Prior Publication Data
US 2022/0263749 A1 Aug. 18, 2022

(51) Int. Cl.
*H04L 45/24* (2022.01)
*H04L 45/12* (2022.01)
*H04L 45/50* (2022.01)

(52) U.S. Cl.
CPC ............ *H04L 45/24* (2013.01); *H04L 45/123* (2013.01); *H04L 45/124* (2013.01); *H04L 45/502* (2013.01)

(58) Field of Classification Search
CPC .......... H04L 45/12–126; H04L 45/243; H04L 45/502; H04L 1/08
See application file for complete search history.

(56) References Cited

U.S. PATENT DOCUMENTS

2008/0279181 A1 11/2008 Shake et al.
2009/0073921 A1* 3/2009 Ji .......................... H04W 40/02
370/328

(Continued)

FOREIGN PATENT DOCUMENTS

JP 200557472 A 3/2005
JP 4074268 B2 4/2008

(Continued)

*Primary Examiner* — Ricky Q Ngo
*Assistant Examiner* — Kabir U Jahangir
(74) *Attorney, Agent, or Firm* — Harness, Dickey & Pierce, P.L.C.

(57) ABSTRACT

A communication apparatus according to an aspect of the present invention is a communication apparatus that is able to be connected to a different communication apparatus via a network including three or more paths, the communication apparatus including a processing circuitry configured to measure a network state for each of the three or more paths, calculate an evaluation value based on a result of measuring the network state for each of the three or more paths, select at least two paths to be used for communication from among the three or more paths based on the calculated evaluation value, generate a packet for transmission through duplication of an input packet, and transmit the generated packet to the different communication apparatus through the selected paths.

7 Claims, 11 Drawing Sheets

(56) References Cited

U.S. PATENT DOCUMENTS

| | | | |
|---|---|---|---|
| 2015/0046558 A1* | 2/2015 | Padgett | H04L 45/26 |
| | | | 709/217 |
| 2016/0134519 A1 | 5/2016 | Ouedraogo et al. | |
| 2018/0270139 A1* | 9/2018 | Singh | H04W 72/0453 |
| 2019/0215385 A1* | 7/2019 | Ethier | H04L 45/123 |
| 2020/0021513 A1* | 1/2020 | Hegde | H04L 45/24 |
| 2020/0136894 A1* | 4/2020 | Bush | H04L 1/08 |
| 2022/0095374 A1* | 3/2022 | Wang | H04W 16/14 |

FOREIGN PATENT DOCUMENTS

| | | |
|---|---|---|
| JP | 200892145 A | 4/2008 |
| JP | 2010177738 A | 8/2010 |
| JP | 2011151547 A | 8/2011 |

\* cited by examiner

| PATH | DELAY BETWEEN UNINTERRUPTED COMMUNICATION APPARATUSES | RELIABILITY | DELAY VARIATION BETWEEN UNINTERRUPTED COMMUNICATION APPARATUSES | COST FOR TRANSFER BETWEEN UNINTERRUPTED COMMUNICATION APPARATUSES | EVALUATION VALUE |
|---|---|---|---|---|---|
| 1 | D_(1)_t0 | R_(1)_t0 | J_(1)_t0 | C_(1)_t0 | F_(1)_t0 |
| 2 | D_(2)_t0 | R_(2)_t0 | J_(2)_t0 | C_(2)_t0 | F_(2)_t0 |
| 3 | D_(3)_t0 | R_(3)_t0 | J_(3)_t0 | C_(3)_t0 | F_(3)_t0 |
| 4 | D_(4)_t0 | R_(4)_t0 | J_(4)_t0 | C_(4)_t0 | F_(4)_t0 |

Fig. 3A

| | DELAY BETWEEN UNINTERRUPTED COMMUNICATION APPARATUSES | RELIABILITY | DELAY VARIATION BETWEEN UNINTERRUPTED COMMUNICATION APPARATUSES | COST FOR TRANSFER BETWEEN UNINTERRUPTED COMMUNICATION APPARATUSES | EVALUATION VALUE |
|---|---|---|---|---|---|
| THRESHOLD VALUE | D_TH | R_TH | J_TH | C_TH | F_TH |

COMMUNICATION APPARATUS AND COMMUNICATION METHOD

CROSS-REFERENCE TO RELATED APPLICATIONS

This application is a 371 U.S. National Phase of International Application No. PCT/JP2019/025193 filed on Jun. 25, 2019. The entire disclosure of the above application is incorporated herein by reference.

TECHNICAL FIELD

The present invention relates to a data transfer technology.

BACKGROUND ART

An uninterrupted network system capable of transferring frames without losing any frames even if a failure occurs in a relay network by duplicating the frames and transmitting the frames through a plurality of paths is known (see Patent Literature 1, for example).

CITATION LIST

Patent Literature

Patent Literature 1: Japanese Patent No. 4074268

SUMMARY OF THE INVENTION

Technical Problem

According to the uninterrupted network system as described above, while it is possible to achieve network quality that a user desires, such as reliability, by increasing the number of paths, more frames flow in the relay network, and this leads to an increase in network load.

The present invention was made in view of the aforementioned circumstances, and an object thereof is to provide a technology for an uninterrupted network system capable of reducing a network load while achieving desired network quality.

Means for Solving the Problem

A communication apparatus according to an aspect of the present invention is a communication apparatus that is able to be connected to a different communication apparatus via a network including three or more paths, the communication apparatus including: a processing circuitry configured to measure a network state for each of the three or more paths, calculate an evaluation value based on a result of measuring the network state for each of the three or more paths, select at least two paths to be used for communication from among the three or more paths based on the calculated evaluation value, generate a packet for transmission through duplication of an input packet, and transmit the generated packet to the different communication apparatus through the selected paths.

Effects of the Invention

The present invention provides a technology for an uninterrupted network system capable of reducing a network load while achieving desired network quality.

DESCRIPTION OF EMBODIMENTS

Hereinafter, embodiments of the present invention will be described with reference to the drawings.
Related Technologies First, an uninterrupted network system according to related technologies will be described with reference to FIGS. 7 to 10. The same reference signs will be applied to similar components throughout FIGS. 7 to 9, and repeated description will be omitted.

Figure 7:
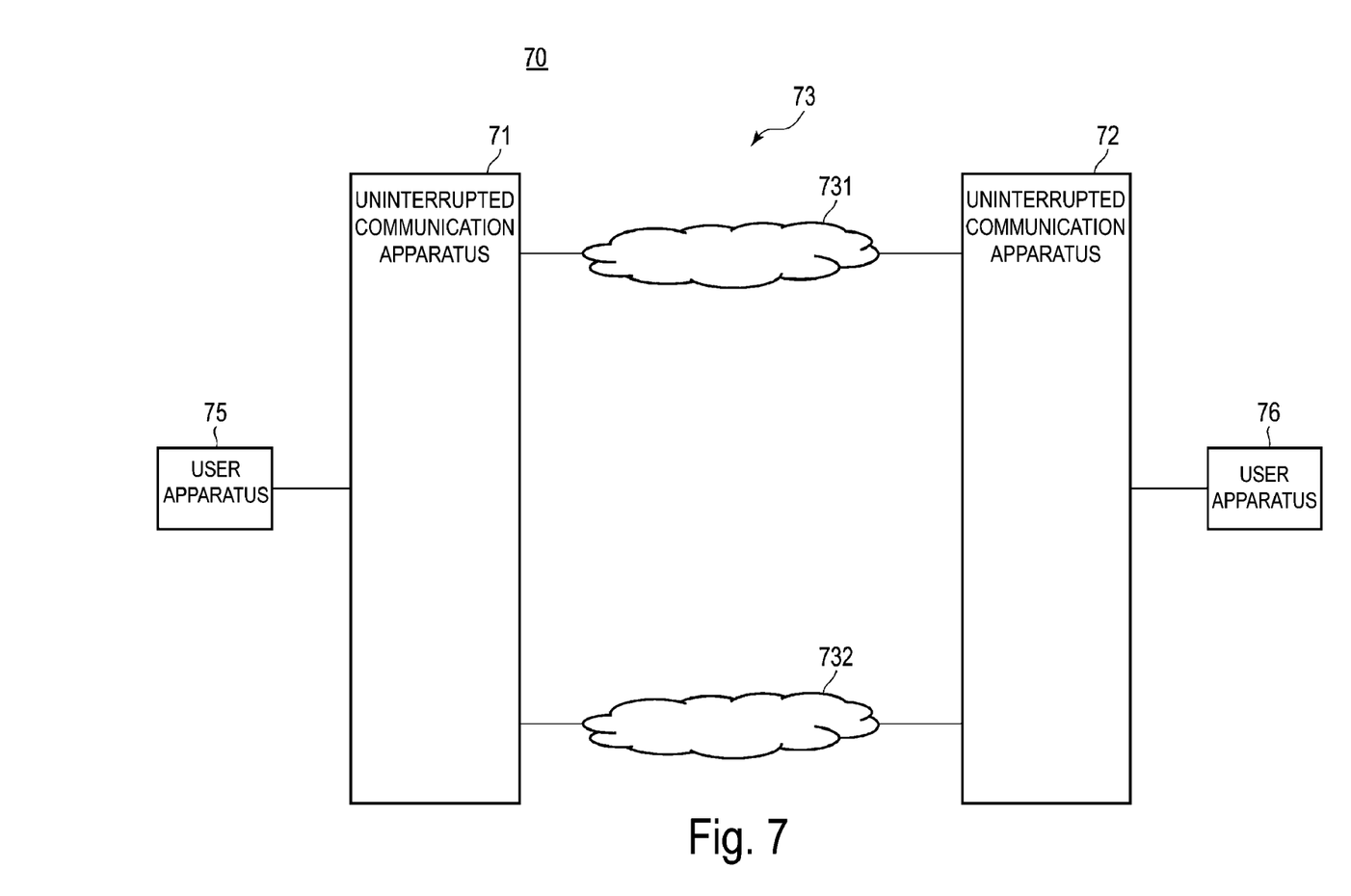
FIG. 7 is a block diagram illustrating, as an example, an uninterrupted network system according to a related technology.

FIG. 7 illustrates an overview of a two-path uninterrupted network system 70 that is an example of an uninterrupted network system according to a related technology. As illustrated in FIG. 7, the uninterrupted network system 70 relays communication between user apparatuses 75 and 76. The uninterrupted network system 70 includes uninterrupted communication apparatuses 71 and 72 and a network 73. The network 73 includes two paths 731 and 732, and the paths 731 and 732 connect the uninterrupted communication apparatuses 71 and 72, respectively. Although the network 73 may be Ethernet (registered trademark), the network 73 is not limited thereto. As the network 73, networks of various layers can be used.

The user apparatus 75 is connected to the uninterrupted communication apparatus 71, and the user apparatus 76 is connected to the uninterrupted communication apparatus 72. The user apparatuses 75 and 76 transmit and receive data to and from each other via the uninterrupted communication apparatuses 71 and 72 and the paths 731 and 732. The transmitted and received data is packeted data (also referred to as a packet) as frames used in the Ethernet. Hereinafter, the transmitted and received data will be referred to as a frame.

Here, the uninterrupted network system 70 will be described by exemplifying a case in which the user apparatus 75 transmits a frame to the user apparatus 76.

The uninterrupted communication apparatus 71 receives a frame directed to the user apparatus 76 from the user apparatus 75 and duplicates the received frame to generate two transmission frames. Each of payloads in the two transmission frames includes the frame from the user apparatus 75. The uninterrupted communication apparatus 71 transmits the two generated frames to the uninterrupted communication apparatus 72 through the paths 731 and 732. The uninterrupted communication apparatus 71 transmits one of the frames to the path 731 and transmits the other frame to the path 732.

The uninterrupted communication apparatus 72 receives the frames from the paths 731 and 732, performs frame selection processing on the received frames, and transmits the frame obtained through the frame selection processing to the user apparatus 76. The uninterrupted communication apparatus 72 receives the same frames from the paths 731 and 732, and the frame selection processing includes selecting one of the frames received from the paths 731 and 732 and discarding the other frame.

It is thus possible to transfer frames from the user apparatus 75 without disconnection even if a failure occurs in one of the paths 731 and 732.

Figure 8:
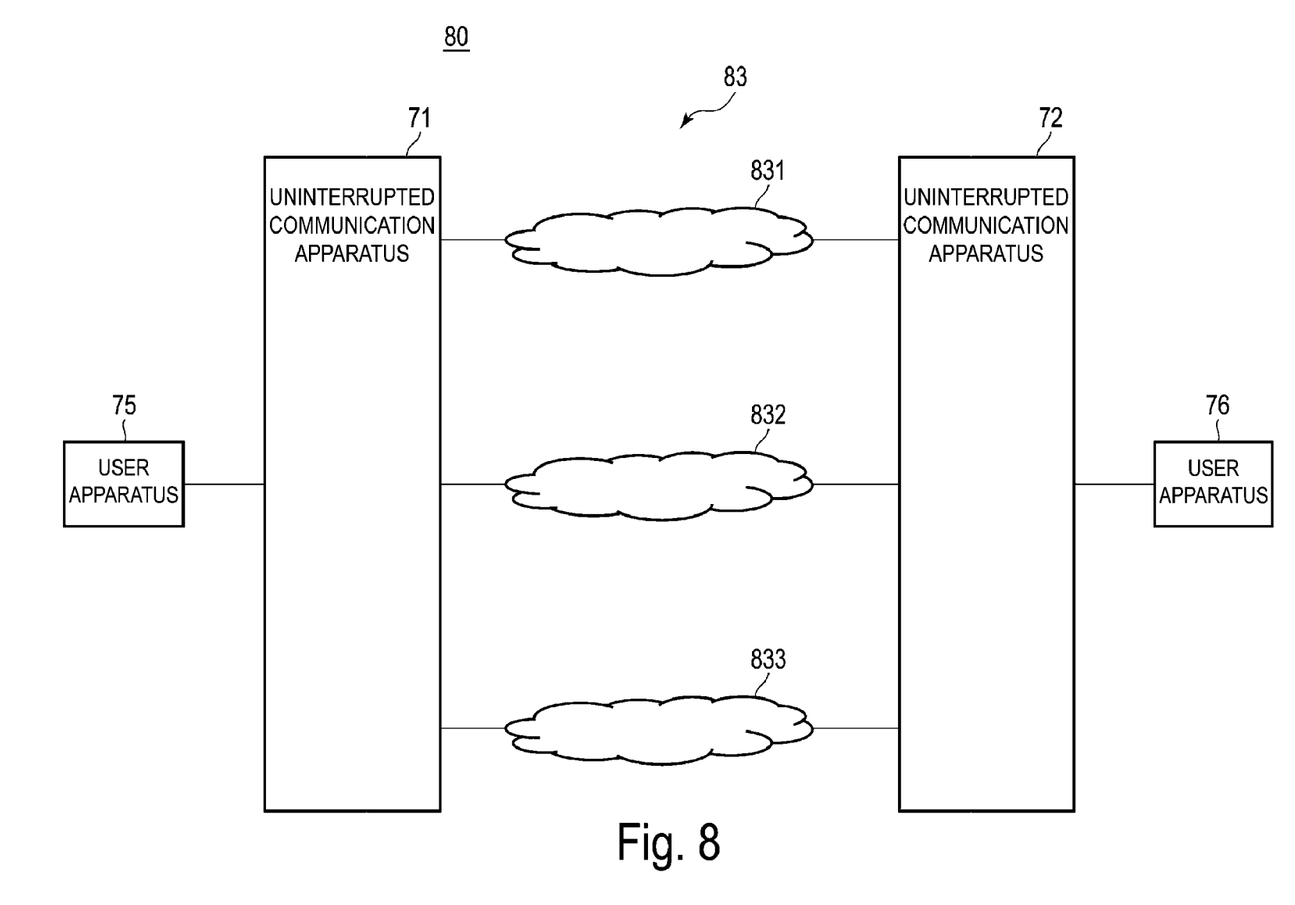
FIG. 8 is a block diagram illustrating another example of an uninterrupted network system according to a related technology.

FIG. 8 illustrates an overview of a three-path uninterrupted network system 80 that is another example of an uninterrupted network system according to a related technology. As illustrated in FIG. 8, the uninterrupted network system 80 includes uninterrupted communication apparatuses 71 and 72 and a network 83. The network 83 includes three paths 831, 832, and 833. The number of paths in the network 83 is one more than the number of paths in the network 73 illustrated in FIG. 7.

The uninterrupted communication apparatuses 71 and 72 transmit and receive frames to and from each other via the paths 831, 832, and 833. For example, the uninterrupted communication apparatus 71 duplicates a frame received from the user apparatus 75 to generate three transmission frames. The uninterrupted communication apparatus 71 transmits the three generated frames to each of the paths 831, 832, and 833. The uninterrupted communication apparatus 72 receives frames from the paths 831, 832, and 833, performs frame selection processing on the frames, and transfers the frames obtained through the frame selection processing to the user apparatus 76.

The uninterrupted network system 80 has higher system reliability corresponding to the number of paths between the uninterrupted communication apparatuses 71 and 72 that is one more than that in the uninterrupted network system 70 illustrated in FIG. 7.

Figure 9:
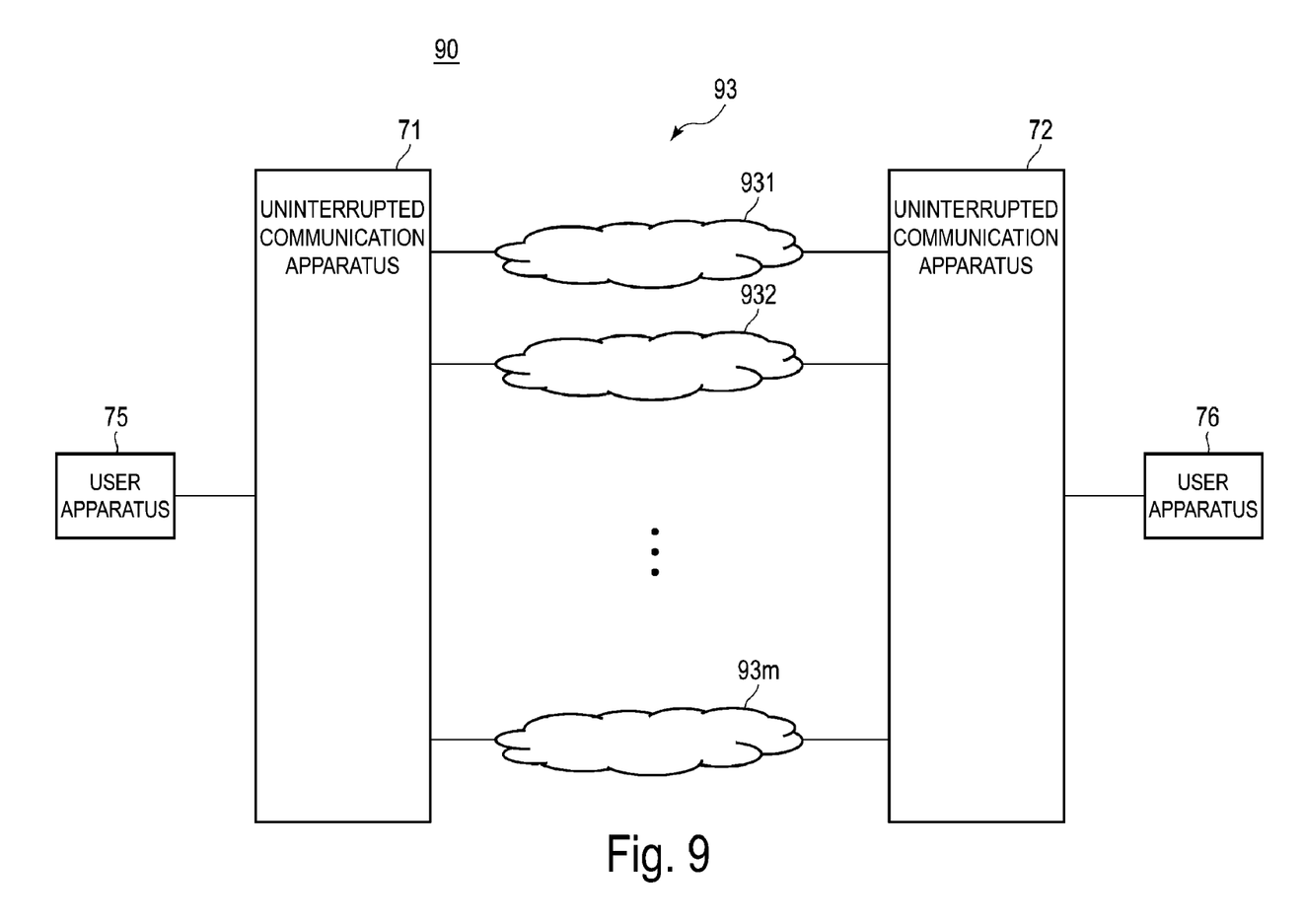
FIG. 9 is a block diagram illustrating yet another example of an uninterrupted network system according to a related technology.

FIG. 9 illustrates an overview of an m-path uninterrupted network system 90 that is yet another example of an uninterrupted network system according to a related technology. Here, m is an integer that is equal to or greater than four. As illustrated in FIG. 9, the uninterrupted network system 90 includes uninterrupted communication apparatuses 71 and 72 and a network 93. The network 93 includes in paths 931, 932, ..., 93m. The number of paths in the network 93 is (m−3) more than the number of paths in the network 83 illustrated in FIG. 8.

The uninterrupted communication apparatuses 71 and 72 transmit and receive frames to and from each other via the paths 931, 932, ..., 93m. For example, the uninterrupted communication apparatus 71 duplicates a frame received from the user apparatus 75 to generate m transmission frames. The uninterrupted communication apparatus 71 transmits the m generated frames to the paths 931, 932, ..., 93m, respectively. The uninterrupted communication apparatus 72 receives frames from the paths 931, 932, ..., 93m, performs frame selection processing on the received frames, and transmits the frame obtained through the frame selection processing to the user apparatus 76.

The uninterrupted network system 90 has higher system reliability corresponding to the number of paths between the uninterrupted communication apparatuses 71 and 72 that is larger than that in the uninterrupted network system 80 illustrated in FIG. 8 by (m−3).

In this manner, network quality is enhanced as the number of paths increases in regard to reliability that is an example of network quality in the uninterrupted network systems. It is also possible to apply such an uninterrupted network system to a network configured with two or less transmission paths.

In the aforementioned uninterrupted network system 80 or 90, frame transfer is performed using all the three paths or all the m paths. In this case, the following problems may occur.

Load on Network

One of the problems is a load on a network apparatus. In a case in which there are a plurality of paths between uninterrupted communication apparatuses, the paths may partially pass the same transmission path or the same network apparatus. It is assumed that in an uninterrupted network system using all n paths (hereinafter, referred to as an n/n-path uninterrupted network system), for example, all paths pass through one network apparatus. Here, n is an integer that is equal to or greater than three. In this case, a load is generated for processing n same frames in the network apparatus. The load becomes significant as the number n of paths increases.

Reliability There may be a case in which it is better to use just two paths from among n paths between the uninterrupted communication apparatuses. An uninterrupted network system selecting two paths from among the n paths and performs communication using the two selected paths will be referred to as a 2/n-path uninterrupted network system. For example, a situation in which reliability in an n/n-path uninterrupted network system is represented as R_(n/n), reliability in a 2/n-path uninterrupted network system is represented as R_(2/n), target reliability is represented as R_TH, and the following inequality is met will be considered.

$$R\_(n/n) \geq R\_(2/n) \geq R\_TH$$

This means a situation in which target reliability is achieved even if all the n paths are used or two paths are used and the remaining (n−2) paths are not used in the n-path uninterrupted network system. Thus, superiority/inferiority of the n/n-path uninterrupted network system and the 2/n-path uninterrupted network system is determined by other indexes.

Power Consumption

One example of other indexes is power consumption of the entire system. Generally, lower power consumption is better. If the power consumption of the n/n-path uninterrupted network system is represented as W_(n/n) and the power consumption of the 2/n-path uninterrupted network system is represented as W_(2/n), the following inequality is satisfied.

$$W\_(n/n) \geq W\_(2/n)$$

A factor that the aforementioned inequality is satisfied is power consumption at ports. Since power is needed to cause the ports that are interfaces with paths to operate, the power consumption at the ports increases in proportion to the number of ports to be used.

Thus, in the case in which the aforementioned inequality is satisfied, the 2/n-path uninterrupted network system is superior to the n/n-path uninterrupted network system if two indexes, namely the reliability and the power consumption are taken into consideration.

However, how to select the two paths from among the n paths in the 2/n-path uninterrupted network system is problematic.

Figure 10:
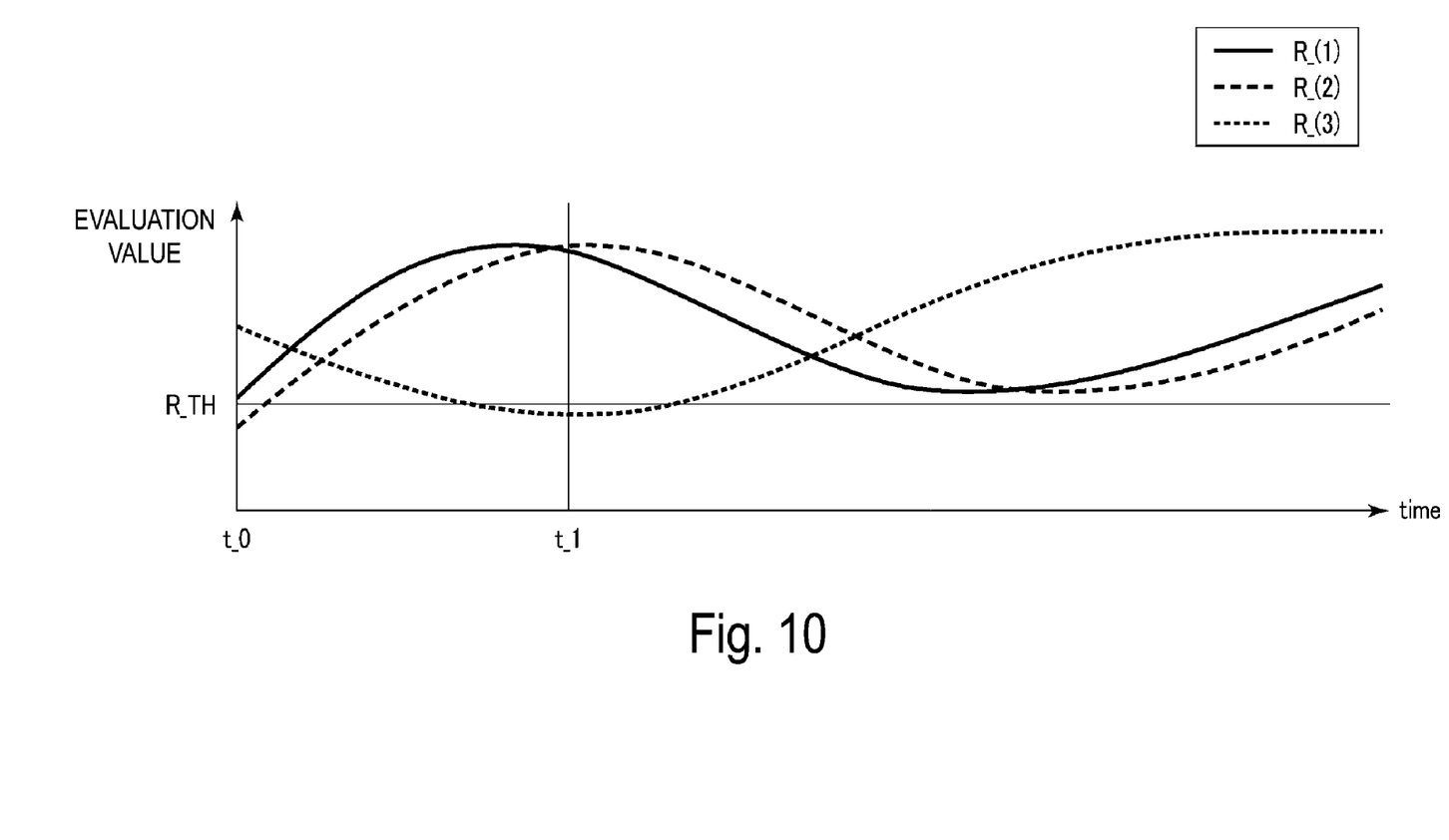
FIG. 10 is a graph illustrating a temporal change in evaluation value for each path in the uninterrupted network system illustrated in FIG. 8.

FIG. 10 illustrates, as an example, a temporal change in evaluation value of each path in the three-path uninterrupted network system 80 illustrated in FIG. 8. In FIG. 10, R_(1), R_(2), and R_(3) represent evaluation values of the three paths. The evaluation values at the time t are calculated based, for example, on reliability and power consumption of the paths measured at the time t. In the example illustrated in FIG. 10, the evaluation value R_(3) is the best at the time t_0.

The evaluation values change with time due to a failure or the like in the network apparatuses or a transmission path in the paths. Thus, a situation in which the evaluation value R(3) at the time t_1 does not satisfy R_TH that is a threshold value of target performance may occur.

EMBODIMENT

Next, an uninterrupted network system according to an embodiment of the present invention will be described with reference to FIGS. 1 to 6.

Configuration

Figure 1:
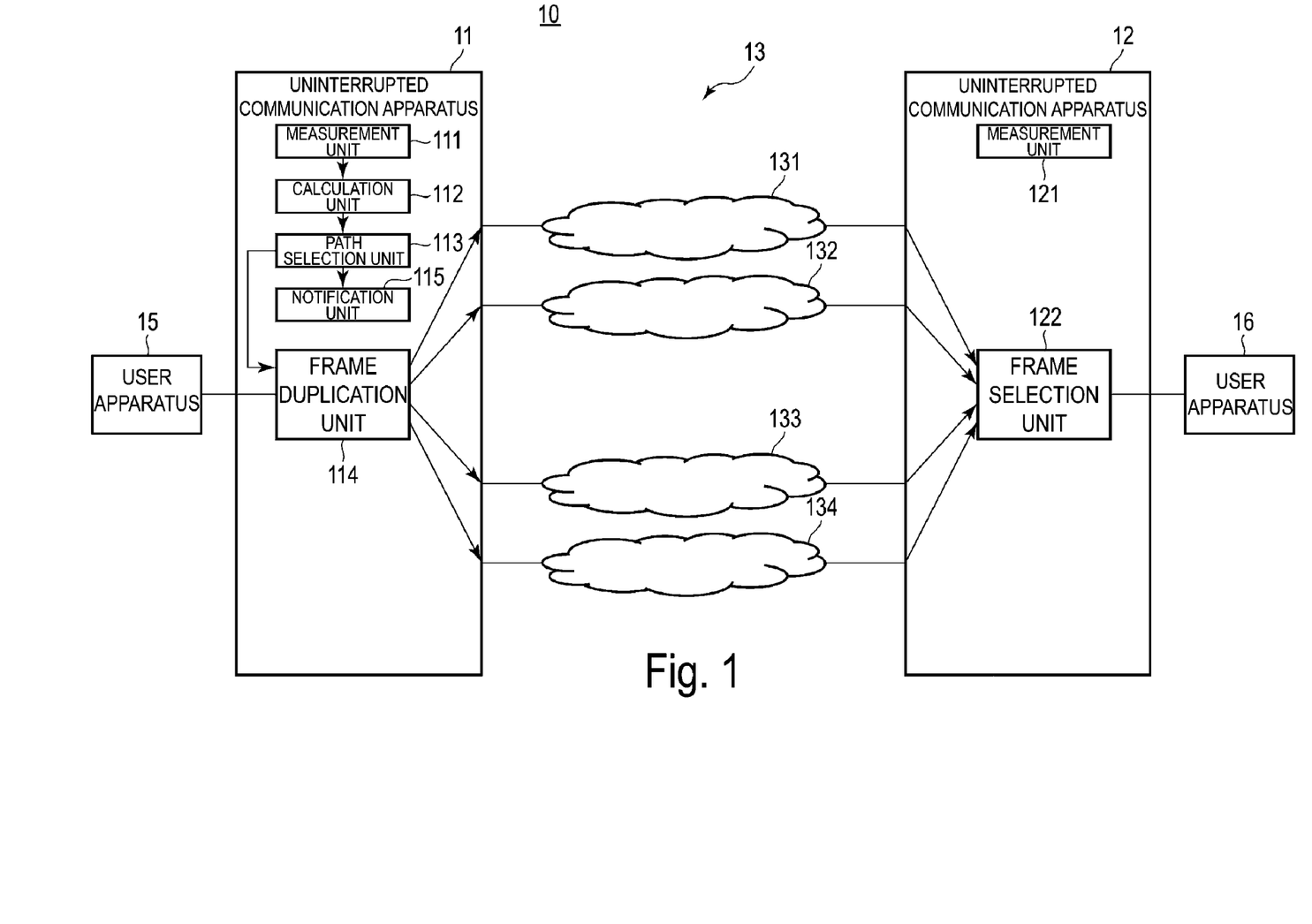
FIG. 1 is a block diagram illustrating, as an example, an uninterrupted network system according to an embodiment.

FIG. 1 illustrates, as an example, an overview of a communication system according to an embodiment of the present invention. The communication system illustrated in FIG. 1 includes an uninterrupted network system 10 and user apparatuses 15 and 16. The uninterrupted network system 10 relays communication between the user apparatuses 15 and 16.

The uninterrupted network system 10 includes uninterrupted communication apparatuses 11 and 12 and a network 13. The uninterrupted communication apparatus 11 is connected directly or indirectly to the user apparatus 15. The uninterrupted communication apparatus 12 is connected directly or indirectly to the user apparatus 16. The uninterrupted communication apparatus 11 is connected to the uninterrupted communication apparatus 12 via the network 13.

The network 13 includes three or more paths. In example in FIG. 1, the network 13 includes four paths 131, 132, 133, and 134. The paths 131, 132, 133, and 134 connect the uninterrupted communication apparatuses 11 and 12. Although the network 13 may be an Ethernet (registered trademark), the network 13 is not limited thereto. As the network 13, networks of various layers can be used.

Here, the uninterrupted network system 10 will be described by exemplifying the case in which the user apparatus 15 transmits a frame to the user apparatus 16.

The uninterrupted communication apparatus 11 includes a measurement unit 111, a calculation unit 112, a path selection unit 113, a frame duplication unit 114, and a notification unit 115. Although the uninterrupted communication apparatus 11 has a transmission function and a reception function, components related to the transmission function are selectively illustrated in FIG. 1 for simplification of explanation. The uninterrupted communication apparatus 11 further includes components related to the reception function.

The measurement unit 111 measures a network state for each of the paths 131 to 134. The network state includes information indicating network quality of each path. Specifically, the network state includes at least one network quality index. Examples of the network quality index includes a delay between the uninterrupted communication apparatuses 11 and 12, reliability, a delay variation (jitter) between the uninterrupted communication apparatuses 11 and 12, and a transfer cost between the uninterrupted communication apparatuses 11 and 12.

The calculation unit 112 calculates an evaluation value based on the result of measuring the network state output from the measurement unit 111, for each of the paths 131 to 134. For example, the calculation unit 112 calculates the evaluation value of each path by applying the result of measuring the network state of the path to a predetermined evaluation function. In the present embodiment, the evaluation function is designed such that the evaluation value increases for better network quality.

The path selection unit 113 selects at least two paths to be used for communication from among the paths 131 to 134 based on the evaluation values calculated by the calculation unit 112. In a case in which there are two or more evaluation values exceeding a predetermined threshold value, for example, the path selection unit 113 selects two paths from among the paths with the evaluation values exceeding the predetermined threshold value. For example, the path selection unit 113 selects the paths with the first and second highest evaluation values. In a case in which the number of evaluation values exceeding the predetermined threshold value is less than two, the path selection unit 113 selects N paths from among the paths 131 to 134. Here, N is an integer that is equal to or greater than three.

Figure 2:
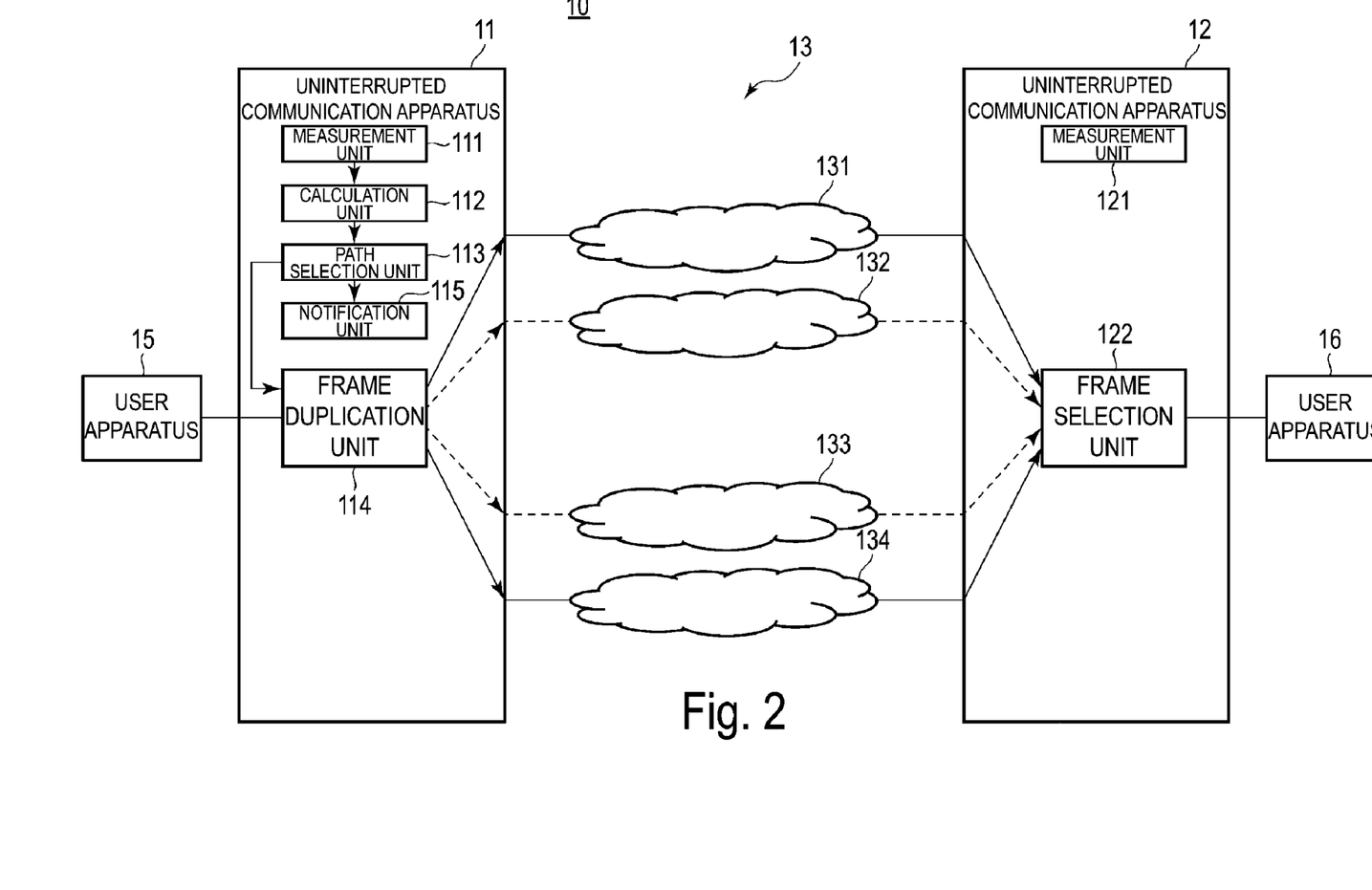
FIG. 2 is a block diagram illustrating, as an example, a state in which two paths have been selected in the uninterrupted network system illustrated in FIG. 1.

The frame duplication unit 114 receives a frame from the user apparatus 15 and duplicates the received frame to generate frames for transmission. The frame duplication unit 114 generates the same number of transmission frames as the number of paths selected by the path selection unit 113. The frame duplication unit 114 transmits the generated frames to the uninterrupted communication apparatus 12 through the paths selected by the path selection unit 113. In a case in which the paths 131 and 134 are selected by the path selection unit 113 as illustrated in FIG. 2, for example, the frame duplication unit 114 duplicates the frame from the user apparatus 15 to generate two frames transmission, transmits one of the generated frames to the path 131, and transmits the other frame to the path 134.

In a case in which the number of evaluation values exceeding the predetermined threshold value is less than two, the notification unit 115 provides a notification that the communication quality of the network 13 is low to a predetermined apparatus (for example, a server that manages the network 13).

The uninterrupted communication apparatus 12 includes a measurement unit 121 and a frame selection unit 122. Although the uninterrupted communication apparatus 12 has a transmission function and a reception function, components related to the reception function are selectively illustrated in FIG. 1 for simplification of explanation. The uninterrupted communication apparatus 12 further includes components related to the transmission function.

The measurement unit 121 operates in conjunction with the measurement unit 111 of the uninterrupted communication apparatus 11 to measure the network state for each of the paths 131 to 134. For example, the measurement unit 121 transmits an Ack frame to the uninterrupted communication apparatus 11 in response to reception of a frame from the uninterrupted communication apparatus 11. The measurement unit 111 of the uninterrupted communication apparatus 11 calculates a delay between the uninterrupted communication apparatuses 11 and 12 based on the Ack frame from the uninterrupted communication apparatus 12.

The frame selection unit 122 receives frames from the paths 131 to 134, performs frame selection processing on the received frames, and transmits the frame obtained through the frame selection processing to the user apparatus 16. In a case in which the uninterrupted communication apparatus 11 transmits frames through the paths 131 and 134 as illustrated in FIG. 2, for example, the frame selection unit 122 receives the same frames from the paths 131 and 134. The frame selection unit 122 selects one of the frames received from the paths 131 and 134 and discards the other frame.

Figure 3A:
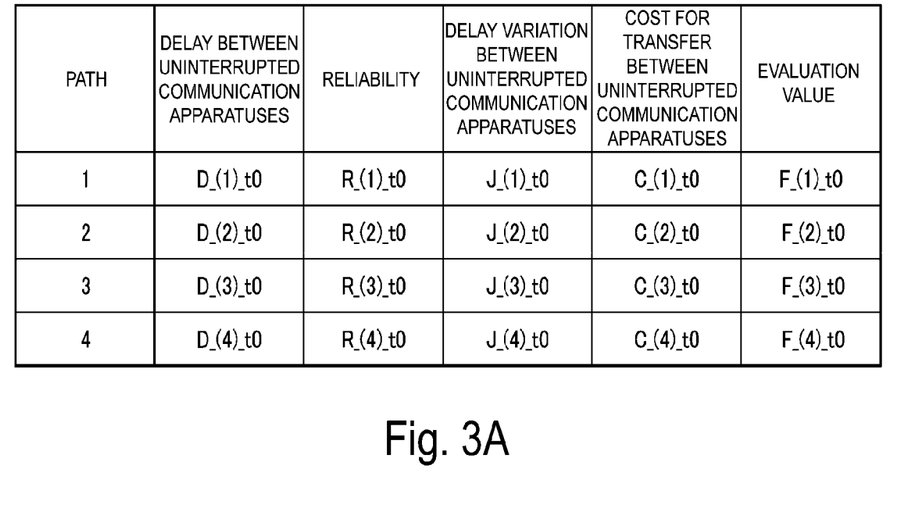
FIG. 3A is a diagram for explaining network states and evaluation values according to the embodiment.

FIG. 3A illustrates, as an example, results obtained by the measurement unit 111 measuring the network states and evaluation values calculated by the calculation unit 112. In the example illustrated in FIG. 3A, the network states include four network quality indexes, namely, a delay between the uninterrupted communication apparatuses, reliability, a delay variation between the uninterrupted communication apparatuses, and a transfer cost between the uninterrupted communication apparatuses. $D\_(x)\_t0$ represents a delay between the uninterrupted communication apparatus in a path x at the time t0. Here, x is an integer from 1 to 4. $R\_(x)\_t0$ represents reliability of the path x at the time t0, $J\_(x)\_t0$ represents a delay variation between the uninterrupted communication apparatus in the path x at the time t0, and $C\_(x)\_t0$ represents a transfer cost between the uninterrupted communication apparatuses in the path x at the time t0. $F\_(x)\_t0$ represents the evaluation value of the path x at the time t0. The calculation unit 112 calculates $F\_(x)\_t0$ from $D\_(x)\_t0$, $R\_(x)\_t0$, $J\_(x)\_t0$, and $C\_(x)\_t0$. The calculation unit 112 calculates $F\_(x)\_t0$ by applying $D\_(x)\_t0$, $R\_(x)\_t0$, $J\_(x)\_t0$, and $C\_(x)\_t0$ to the evaluation function. In a case in which the user desires to reduce the transfer cost, for example, the evaluation function is designed to depend mainly on the transfer cost.

Figure 3B:
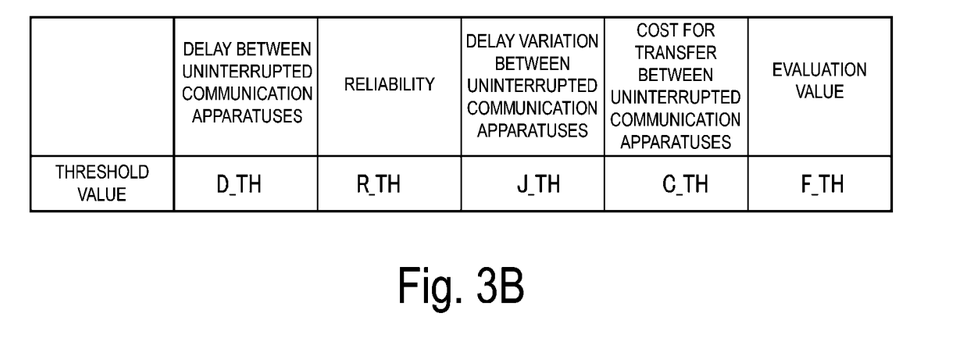
FIG. 3B is a diagram illustrating a threshold value set for the network state and the evaluation value according to the embodiment.

FIG. 3B illustrates, as an example, of threshold values set for the network states and the evaluation values. In FIG. 3B, D_TH represents a threshold value for the delay between the uninterrupted communication apparatuses, R_TH represents a threshold value for the reliability, J_TH represents a threshold value for a delay variation between the uninterrupted communication apparatuses, C_TH represents a threshold value for a transfer cost between the uninterrupted communication apparatuses, and F_TH represents a threshold value for the evaluation values.

The path selection unit 113 compares the evaluation values $F\_(1)\_t0$, $F\_(2)\_t0$, $F\_(3)\_t0$, and $F\_(4)\_t0$ with the threshold value F_TH and selects at least two paths to be used for communication based on the result of the comparison. In a case in which the evaluation values are high in the descending order of $F\_(1)\_t0$, $F\_(4)\_t0$, $F\_(3)\_t0$, and $F\_(2)\_t0$, and the three highest evaluation values $F\_(1)\_t0$, $F\_(4)\_t0$, and $F\_(3)\_t0$ exceed the threshold value F_TH ($F\_(1)\_t0 > F\_(4)\_t0 > F\_(3)\_t0 > F\_TH > F\_(2)\_t0$), for example, the path selection unit 113 selects the paths 131 and 134 with the first and second highest evaluation values.

The path selection unit 113 may use the threshold values D_TH, R_TH, J_TH, and C_TH for path selection in addition to the threshold value F_TH. In a case in which the reliability $R\_(4)\_t0$ of the path 134 is lower than the threshold value R_TH, and the reliability $R\_(4)\_t$ of the path 133 is higher than the threshold value R_TH in the aforementioned example, the path selection unit 113 may select the paths 131 and 133, for example.

Figure 4:
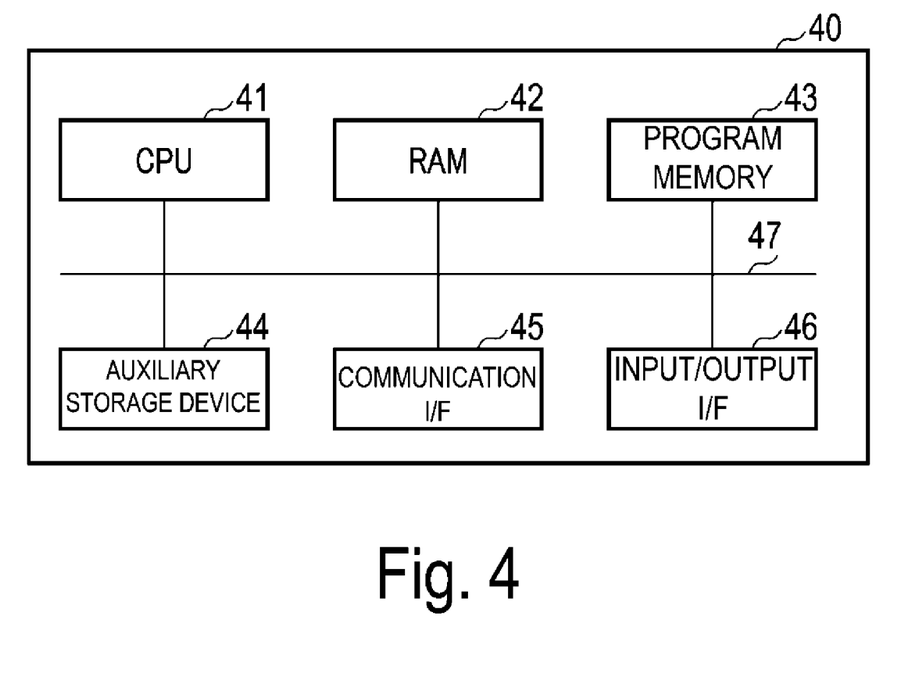
FIG. 4 is a block diagram illustrating a hardware configuration example of a communication apparatus according to the embodiment.

FIG. 4 illustrates an overview of an example of a hardware configuration of a communication apparatus 40 according to an embodiment of the present invention. The communication apparatus 40 illustrated in FIG. 4 can be an example of the user apparatus 15, the user apparatus 16, the uninterrupted communication apparatus 11, or the uninterrupted communication apparatus 12 illustrated in FIG. 1.

As illustrated in FIG. 4, the communication apparatus 40 includes, as hardware, a central processing unit (CPU) 41, a random access memory (RAM) 42, a program memory 43, an auxiliary storage device 44, a communication interface 45, and an input/output interface 46. The CPU 41 communicates with the RAM 42, the program memory 43, the auxiliary storage device 44, the communication interface 45, and the input/output interface 46 via a bus 47.

The CPU 41 is an example of a general-purpose hardware processor. The RAM 42 is used as a working memory by the CPU 41. The RAM 42 includes a volatile memory such as a synchronous dynamic random access memory (SDRAM). The program memory 43 stores, in a non-transitory manner, various programs and setting data needed to execute the programs. Each program stored in the program memory 43 includes computer executable instructions. The program (computer executable instructions) causes the CPU 41 to execute predetermined processing when executed by the CPU 41. As the program memory 43, a read only memory (ROM), a part of the auxiliary storage device 44, or a combination thereof, for example, is used. The auxiliary storage device 44 stores data in a non-transitory manner. The auxiliary storage device 44 includes a non-volatile memory such as a hard disk drive (HDD) or a solid state drive (SSD).

In a case in which the communication apparatus 40 is the uninterrupted communication apparatus 11 illustrated in FIG. 1, the program memory 43 stores an uninterrupted communication program. When the uninterrupted communication program is executed by the CPU 41, the program causes the CPU 41 to execute a series of processes described in relation to the measurement unit 111, the calculation unit 112, the path selection unit 113, the frame duplication unit 114, and the notification unit 115.

The communication interface 45 is an interface for performing communication with different communication apparatuses. In a case in which the communication apparatus 40 is the uninterrupted communication apparatus 11 illustrated in FIG. 1, the different communication apparatuses include the user apparatus 15 and the network apparatus included in the network 13 illustrated in FIG. 1. The communication interface 45 includes a wireless module, a wired module, or a combination thereof. The input/output interface 46 includes a plurality of terminals to connect input devices and output devices. Examples of the input devices include a keyboard, a mouse, and a microphone. Examples of the output devices include a display device and a speaker.

The program may be provided to the communication apparatus 40 in a state in which the program is stored in a computer readable storage medium. In this case, the communication apparatus 40 further includes a drive (not illustrated) to read data from the storage medium and acquires the program from the storage medium, for example. Examples of the storage medium include a magnetic disk, an optical disc (a CD-ROM, a CD-R, a DVD-ROM, a DVD-R, and the like), a magneto-optical disc (an MO and the like), and a semiconductor memory. The program may be stored in a server on a communication network, and the communication apparatus 40 may download the program from the server using the communication interface 45.

The processing described in the embodiment is not limited to the processing performed by a general-purpose processor such as the CPU 41 executing the program and may be performed by a dedicated hardware processor such as an application specific integrated circuit (ASIC). The term "processing circuitry" used herein includes at least one general-purpose hardware processor, at least one dedicated hardware processor, or a combination of at least one general-purpose hardware processor and at least one dedicated hardware processor. In the example illustrated in FIG. 4, the CPU 41, the RAM 42, and the program memory 43 correspond to the processing circuitry.

Operations

Next, an operation example of the uninterrupted communication apparatus 11 illustrated in FIG. 1 will be described. Here, a situation in which the user apparatus 15 transmits data to the user apparatus 16 through the uninterrupted network system 10 including the uninterrupted communication apparatuses 11 and 12 and the network 13 will be described. The uninterrupted communication apparatus 11 includes the measurement unit 111, the calculation unit 112, the path selection unit 113, the frame duplication unit 114, and the notification unit 115 as described above in regard to FIG. 1.

Figure 5:
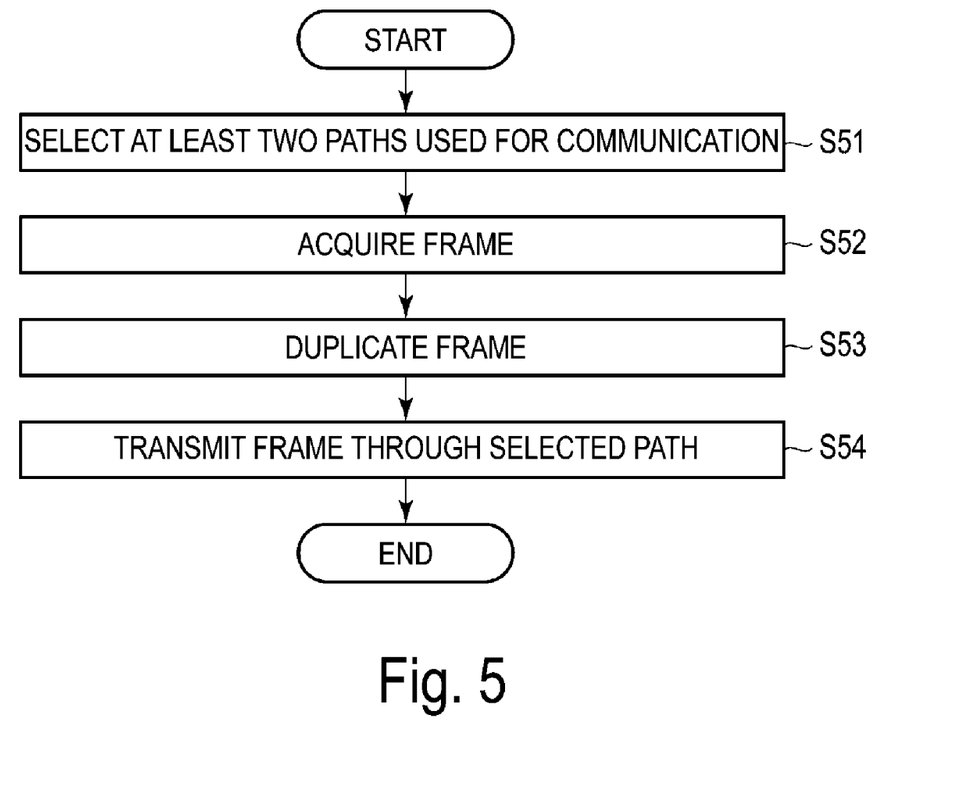
FIG. 5 is a flowchart illustrating, as an example, a communication method according to the embodiment.

FIG. 5 illustrates an overview of a processing procedure of a communication method executed by the uninterrupted communication apparatus 11. As illustrated in FIG. 5, the uninterrupted communication apparatus 11 determines at least two paths used for communication (Step S51). The path determination in Step S51 will be described later with reference to FIG. 6. The uninterrupted communication apparatus 11 periodically performs path determination. Alternatively or additionally, the uninterrupted communication apparatus 11 may perform path determination in response to occurrence of communication interruption in any of the paths used for communication.

The frame duplication unit 114 acquires a frame directed to the user apparatus 16 from the user apparatus 15 (Step S52). The frame duplication unit 114 duplicates the acquired frame to generate the same number of frames for transmission as the number of paths determined in Step S51 (Step S53). The frame duplication unit 114 transmits the generated frames to the uninterrupted communication apparatus 12 through the paths determined in Step S51 (Step S54).

In this manner, the uninterrupted communication apparatus 11 transfers the frame received from the user apparatus 15 to the uninterrupted communication apparatus 12 selectively using the paths 131 to 134 included in the network 13. The uninterrupted communication apparatus 12 receives the frames from at least the two paths and selectively transfers the received frames to the user apparatus 16. In this manner, the frame output from the user apparatus 15 arrives at the user apparatus 16.

Figure 6:
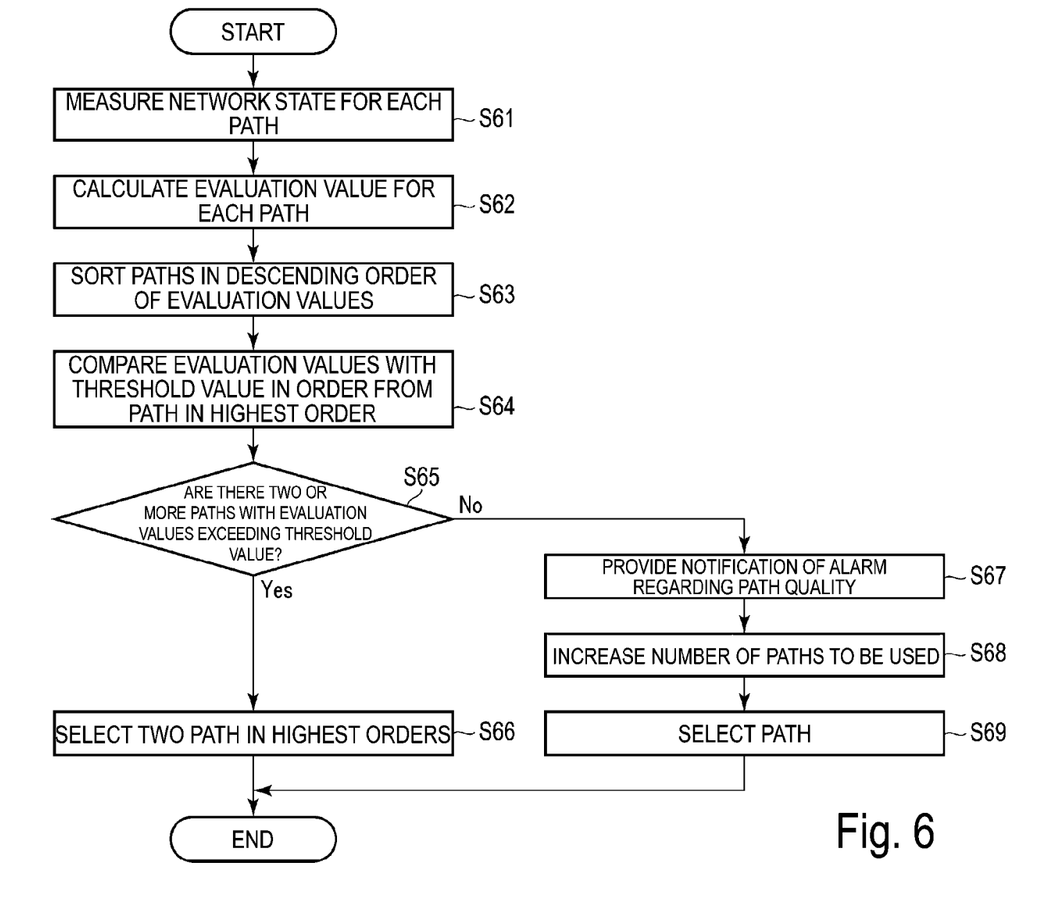
FIG. 6 is a flowchart illustrating a processing example of the selection processing illustrated in FIG. 5.

FIG. 6 illustrates an overview of a procedure example for path determination illustrated in Step S51 in FIG. 5. As illustrated in FIG. 6, the measurement unit 111 measures a network state for each of the paths 131 to 134 (Step S61). For example, the measurement unit 111 measures a delay between the uninterrupted communication apparatuses, reliability, a delay variation between the uninterrupted communication apparatuses, and a transfer cost between the uninterrupted communication apparatuses for each of the paths 131 to 134. In a case in which the paths 131 and 134 are used for communication as illustrated in FIG. 2, for example, the measurement unit 111 may perform measurement for each of the paths 131 and 134 using a data frame that is a frame derived from the frame from the user apparatus 15 and perform measurement for each of the paths 132 and 133 using a frame (for example, a control frame) that is different from the data frame.

The calculation unit 112 calculates the evaluation value based on the result of measuring the network state for each of the paths 131 to 134 (Step S62). For example, the calculation unit 112 calculates the evaluation value of each path by applying the result of measuring the network state of the path to a predetermined evaluation function.

The path selection unit 113 selects at least two paths used for communication from among the paths 131 to 134 based on the evaluation values of the paths 131 to 134.

For example, the path selection unit 113 sorts a path list in a descending order of the evaluation value (Step S63). The path list includes identification information for identifying each path and the evaluation value for each of the paths 131 to 134. Then, the path selection unit 113 performs threshold processing on paths from the highest order in the path list (Step S64). The path selection unit 113 compares the evaluation value of the path that is a target of the processing with a preset threshold value and holds the result of the comparison. The path selection unit 113 may end the threshold processing in a case in which an evaluation value of a certain path is detected to be below the threshold value. In other words, in a case in which the evaluation value of a certain path is detected to be below the threshold value, the path selection unit 113 may not perform the threshold processing on the paths in the lower orders than the path.

Next, the path selection unit 113 determines whether or not the number of paths with the evaluation values exceeding the threshold value is two or more (Step S65). In accordance with a determination that the number of paths with the evaluation values exceeding the threshold value is two or more (Step S65: Yes), the path selection unit 113 selects the paths in the two highest orders in the path list as the paths to be used for communication (Step S66).

On the other hand, in accordance with a determination that the number of paths with the evaluation values exceeding the threshold value is less than two (Step S65; No), the notification unit 115 provides a notification that communication quality is low to a predetermined apparatus (Step S67). The path selection unit 113 increases the number of paths to be used for communication (Step S68). Next, the path selection unit 113 selects paths by the determined number from the paths in the highest orders in the path list (Step S69). In one example, the path selection unit 113 determines the number of paths to be used for communication in accordance with the number of paths with the evaluation values exceeding the threshold value. In a case in which the number of paths with the evaluation values exceeding the threshold value is one, for example, the path selection unit 113 determines the number of paths to be used for communication to be three. In a case in which there are no paths with the evaluation values exceeding the threshold value, the path selection unit 113 determines the number of paths to be used for communication to be four.

In this manner, the uninterrupted communication apparatus 11 determines the paths to be used for frame transmission to the uninterrupted communication apparatus 12.

Advantages

As described above, the uninterrupted network system 10 includes the uninterrupted communication apparatus 11, the uninterrupted communication apparatus 12, and the network 13 including the paths 131 to 134 that connects the uninterrupted communication apparatuses 11 and 12. The uninterrupted communication apparatus 11 measures the network state for each of the paths 131 to 134, calculates the evaluation value based on the result of measuring the network state for each of the paths 131 to 134, selects at least two paths to be used for communication from among the paths 131 to 134 based on the calculated evaluation value, duplicates an input frame to generate frames to transmission, and transmits the generated frames to the uninterrupted communication apparatus 12 through the selected paths. The uninterrupted communication apparatus 11 may select two paths from among the paths with the evaluation values exceeding the threshold value in a case in which the number of the evaluation values exceeding the threshold value is two or more, and may select at least three paths in a case in which the number of evaluation values exceeding the threshold value is less than two.

With the aforementioned configuration, paths with high communication quality are used for communication. This reduces the number of paths to be used for communication. As a result, it is possible to reduce a network load while achieving desired network quality.

The uninterrupted communication apparatus 11 may measure the network state using the data frame derived from the frame from the user apparatus 15 for each path being used for communication and measure the network state using a frame that is different from the data frame for the other paths. This enables measurement of the network state of each path without affecting frame transfer between the user apparatuses 15 and 16.

The network state includes at least one network quality index such as a delay between the uninterrupted communication apparatuses, a reliability, a delay variation between the uninterrupted communication apparatuses, and a transfer cost between the uninterrupted communication apparatuses. It is thus possible to reduce a network load while achieving a network quality index in accordance with a user's requirement. For example, it is possible to provide a system with a low transfer cost for a user who desires to reduce the transfer cost. For example, it is possible to provide a system with a delay between the uninterrupted communication apparatuses for a user who desires to reduce the delay between the uninterrupted communication apparatuses.

The uninterrupted communication apparatus 11 may periodically perform the path selection. The uninterrupted communication apparatus 11 can thus be adapted to a temporal change in network state. The uninterrupted communication apparatus 11 may perform path selection in response to occurrence of communication interruption in any of the paths being used for communication. The uninterrupted communication apparatus 11 can thus be quickly adapted to a temporal change in network state.

MODIFICATION EXAMPLES

In the aforementioned embodiment, the path selection unit 113 selects two paths in a case in which the number of evaluation values exceeding the predetermined threshold value is equal to or greater than two and selects at least three paths in a case in which the number of evaluation values exceeding the predetermined threshold value is less than two. In another embodiment, the path selection unit 113 may select N paths in a case in which the number of evaluation values exceeding the predetermined threshold value is equal to or greater than N and may select at least (N+1) paths in a case in which the number of evaluation values exceeding the predetermined threshold value is less than N, where N is an integer that is equal to or greater than three.

It is to be noted that the present invention is not limited to the aforementioned embodiments and can be variously modified in the implementation stage without departing from the gist of the present invention. Also, the embodiments may appropriately be performed in combination as long as possible, and in such a case, combined effects can be obtained. Further, the aforementioned embodiment includes the invention in various stages, and various inventions can be extracted from appropriate combinations of a plurality of disclosed components.

REFERENCE SIGNS LIST

10 Uninterrupted network system
11 Uninterrupted communication apparatus
111 Measurement unit
112 Calculation unit
113 Path selection unit
114 Frame duplication unit
115 Notification unit
12 Uninterrupted communication apparatus
121 Measurement unit
122 Frame selection unit
13 Network
131 to 134 Path
15, 16 User apparatus
40 Communication apparatus
41 CPU
42 RAM
43 Program memory
44 Auxiliary storage device
45 Communication interface
46 Input/output interface
47 Bus
70, 80, 90 Uninterrupted network system
71, 72 Uninterrupted communication apparatus
73, 83, 93 Network
75, 76 User apparatus

The invention claimed is:

1. A communication apparatus that is able to be connected to a different communication apparatus via a network including three or more paths, the communication apparatus comprising:
a processing circuitry configured to
measure a network state for each of the three or more paths,
calculate an evaluation value based on a result of measuring the network state for each of the three or more paths,
wherein the network state includes a delay between the communication apparatus and the different communication apparatus, reliability, a delay variation between the communication apparatus and the different communication apparatus, and a transfer cost between the communication apparatus and the different communication apparatus,
select at least two paths to be used for communication from among the three or more paths based on the calculated evaluation value,
generate a packet for transmission through duplication of an input packet, and
transmit the generated packet to the different communication apparatus through the selected paths.

2. The communication apparatus according to claim 1, wherein the processing circuit is configured to perform processing, which includes the measuring of the network state, the calculating of the evaluation value, and the selecting of the at least two paths to be used for the communication, periodically or in response to occurrence of communication interruption in any of paths that are being used for the communication.

3. The communication apparatus according to claim 1, wherein the selecting of the at least two paths to be used for the communication includes
selecting two paths from among paths with the calculated evaluation values exceeding a threshold value in a case in which the number of the calculated evaluation values exceeding the threshold value is two or more, and
selecting N paths from among the three or more paths in a case in which the number of the calculated evaluation values exceeding the threshold value is less than two, and
N is an integer that is equal to or greater than three.

4. The communication apparatus according to claim 1, wherein the processing circuit is configured to measure the network state using a data packet derived from the input packet for a first path that is being used for the communication from among the three or more paths and measure the network state using a packet different from the data packet for a second path that is different from the first path from among the three or more paths.

5. A communication method for communicating with a communication apparatus connected via a network including three or more paths, the method comprising:
measuring a network state for each of the three or more paths,
wherein the network state includes a delay between the communication apparatus and a different communication apparatus, reliability, a delay variation between the communication apparatus and the different communication apparatus, and a transfer cost between the communication apparatus and the different communication apparatus;
calculating an evaluation value based on a result of measuring the network state for each of the three or more paths;
selecting at least two paths to be used for communication from among the three or more paths based on the calculated evaluation value;
generating a packet for transmission through duplication of an input packet; and
transmitting the generated packet to the communication apparatus via the selected paths.

6. A network system comprising:
a first communication apparatus;
a second communication apparatus; and
a network that includes three or more paths for connecting the first communication apparatus and the second communication apparatus,
wherein the first communication apparatus includes a first processing circuitry configured to
measure a network state for each of the three or more paths,
wherein the network state includes a delay between the communication apparatus and a different communication apparatus, reliability, a delay variation between the communication apparatus and the different communication apparatus, and a transfer cost between the communication apparatus and the different communication apparatus,
calculate an evaluation value based on a result of measuring the network state for each of the three or more paths,
select at least two paths to be used for communication from among the three or more paths based on the calculated evaluation value,
generate a packet for transmission through duplication of an input packet, and
transmit the generated packet to the second communication apparatus through the selected paths, and
the second communication apparatus includes a second processing circuitry configured to
receive the packet from the selected paths,
perform selection processing on the received packet, and
output data obtained through the selection processing.

7. A communication apparatus that is able to be connected to a different communication apparatus via a network including three or more paths, the communication apparatus comprising:
a processing circuitry configured to
measure a network state for each of the three or more paths,
calculate an evaluation value based on a result of measuring the network state for each of the three or more paths,
select at least two paths to be used for communication from among the three or more paths based on the calculated evaluation value,
generate a packet for transmission through duplication of an input packet, and
transmit the generated packet to the different communication apparatus through the selected paths,
wherein the selection of the at least two paths to be used for the communication includes:
selecting two paths from among paths with the calculated evaluation values exceeding a threshold value in a case in which the number of the calculated evaluation values exceeding the threshold value is two or more, and
selecting N paths from among the three or more paths in a case in which the number of the calculated evaluation values exceeding the threshold value is less than two, and
N is an integer that is equal to or greater than three.

* * * * *